United States Patent [19]

Reinartz et al.

[11] Patent Number: 5,014,514

[45] Date of Patent: May 14, 1991

[54] METHOD FOR ASSEMBLING A PISTON-AND-CYLINDER UNIT WITH A FORCE TRANSMISSION ELEMENT

[75] Inventors: Hans-Dieter Reinartz, Frankfurt am Main; Helmut Steffes, Hattersheim; Holger V. Hayn, Bad Vilbel, all of Fed. Rep. of Germany

[73] Assignee: Alfred Treves GmbH, Frankfurt am Main, Fed. Rep. of Germany

[21] Appl. No.: 367,156

[22] Filed: Jun. 16, 1989

[30] Foreign Application Priority Data

Jul. 13, 1988 [DE] Fed. Rep. of Germany ....... 3823630

[51] Int. Cl.[5] .............................................. F15B 7/00
[52] U.S. Cl. ...................................... 60/533; 60/588; 92/13; 92/13.41
[58] Field of Search ................. 60/533, 534, 546, 562, 60/588, 547.1, 556, 581; 92/13.4, 13.41, 169.1, 170.1

[56] References Cited

U.S. PATENT DOCUMENTS

| | | | |
|---|---|---|---|
| 4,229,940 | 10/1980 | Higgerson | 60/562 |
| 4,307,570 | 12/1981 | Yardley | 92/13.41 |
| 4,433,543 | 2/1984 | Thomas et al. | 60/581 |
| 4,453,380 | 6/1984 | Meynier | 60/547.1 |
| 4,474,004 | 10/1984 | Thomas | 60/574 |
| 4,732,002 | 3/1988 | Farr | 60/556 |

*Primary Examiner*—Edward K. Look
*Assistant Examiner*—Thomas Denion
*Attorney, Agent, or Firm*—Robert P. Seitter; J. Gordon Lewis

[57] ABSTRACT

A method is suggested for assembling a tandem master cylinder and a vacuum brake booster of a hydraulic brake system for automotive vehicles. Air is injected via the pressure connection (19) of the pressure chamber (18) associated with the push-rod piston (2). Simultaneously, the push-rod piston (2) is moved in the direction pointing away from the brake pedal. The pressure increase in pressure chamber (18) is measured during the movement of the push-rod piston and, thus, during the movement of the central valve (6) accommodated in the push-rod piston. As soon as the closure member (5) of the central valve is seated on the valve seat (4), thus the central valve being closed, the air pressure will increase in the chamber (18). In the curve of the "pressure-against-central-valve-travel" diagram, which curve indicates the pressure increase, a trigger point is established which determines a measured distance on the abscissa of the diagram. Said measured distance is the standard for the number and/or dimensioning of spacing washers (8) to be arranged between the pressure element (9) and the push-rod piston in order to achieve a reduction of the lost travel of the central valve. By means of this invention, an elegant method in conformity with the demands of automation is achieved for assembling a tandem master cylinder and a vacuum brake booster and for simultaneous reduction of the lost travel of the central valve.

4 Claims, 2 Drawing Sheets

METHOD FOR ASSEMBLING A PISTON-AND-CYLINDER UNIT WITH A FORCE TRANSMISSION ELEMENT

BACKGROUND OF THE INVENTION

This invention relates to a method for assembling a piston-and-cylinder unit with a transmission element such as a pressure element, with the unit at least having a pressure piston with a valve element which opens or closes the pressure chamber associated with the piston in dependence on the movement of the pressure piston. Such valve elements, e.g., are described in German Published Patent Application (Deutsche Offenlegungsschrift) No. 36 29 564. This application describes a brake system with slip control essentially consisting of a pedal-operated, preferably auxiliary-energy-assisted braking pressure generator which the wheel brakes are connected to via pressure lines, of a hydraulic auxiliary pressure supply system with a hydraulic pump, with a pressure-compensation-and-pressure-medium-storage reservoir and with an auxiliary pressure control valve as well as of wheel sensors and electronic circuits for determining the rotational behavior of the wheels and for generating electric braking pressure control signals by means of which electromagnetically operable pressure medium inlet valves and outlet valves are controllable which are inserted into the pressure medium lines for the purpose of slip control.

The subject matter of the cited published patent application is characterized by a switch inserted into the pressure line of the auxiliary energy source, said switch operating, when a predetermined hydraulic pressure is reached, to emit an electric signal to the signal processing and combining circuit which will cause the pump's motor to switch on and off for a checking cycle and which thus can signal the driver of the vehicle the motor-and-pump unit's readiness for operation via a visual or acoustic display.

When combining master cylinders and vacuum brake boosters as described in the cited published patent application as well as, generally, when assembling a piston-and-cylinder unit with a force transmission element, with a valve being arranged in one piston of the unit, there will result the disadvantages described below and explained with reference to the central valve of the subject matter of the above-mentioned published patent application.

The closing travel of the central valve of the pushrod piston circuit and the lost travel associated therewith will become too large by assembly. Said excessive lost travel results from the adding-up of many tolerances of the individual components of the tandem master cylinder. If this closing travel is multiplied with the pedal transmission there will result disadvantages when the pedal is operated.

According to prior art the tandem master cylinder will be assembled, with the spacing washers and the pressure element being excepted. Then, a measurement is made of the axial distance between the surface of the flange of the master cylinder, on the one hand, and the bore depth of the pressure element, on the other hand, said flange serving for connecting the vacuum brake booster and thus constituting a reference point to the location of elements of the booster. The number of spacing washers will be determined in a further step. Subsequently, the spacing washers and the pressure element with retaining ring will be assembled.

In this way, in prior art it is admittedly achieved that the tandem master cylinder and the vacuum booster are assembled free from play. On the other hand, however, all the tolerances of the individual components fully add to the closing travel of the central valve in a very disadvantageous manner. The lost travel of the central valve becomes correspondingly large. As illustrated above, it disadvantageously multiplies with the pedal transmission.

SUMMARY OF THE INVENTION

The invention is based on the following objects:

The described disadvantages of prior art are to be avoided. The closing travel of the central valve is to be shortened. An ideal closing travel is to be achieved. It is to be avoided that the tolerances of the individual components add up and be reckoned with in the central valve's closing travel.

The costs incurred for assembly of the cylinder are to be reduced. The adjustment of the closing travel of the central valve is to be performed within the scope of the overall cylinder adjustment.

It is to be made possible to use components with rougher tolerances to lead to a reduction in the final product price.

According to this invention, the objects set forth are solved by a special method for assembling the piston-and-cylinder unit and the force transmission element. According to this method, it is provided that, in order to reduce the lost travel of the spring-loaded closure member and/or of the spring-loaded valve seat of the valve element, the pressure piston is moved against a spring force with a force to be measured which experiences a marked increase due to the closing operation of the valve element; that the travel of the piston from its initial position up to the marked increase (measured distance) is used as a reference dimension for the dimensioning of one or of a plurality of spacers to be arranged between the force transmission element and the piston in order to reduce the lost travel.

Alternatively, it may be provided that, in order to reduce the lost travel of the closure member and/or of the valve seat of the valve element, the valve element, in particular as an integral component of the pressure piston, is moved along with the pressure piston in the direction of the pressure increase; that, simultaneously, the pressure chamber associated with the pressure piston is exposed to a measurable medium, in particular air, with a pressure to be measured which experiences a marked increase due to the closing operation of the valve element; that the travel of the valve element from its initial position up to the marked increase (measured distance) is used as a reference for the dimensioning of one or of a plurality of spacers to be arranged between the force transmission element and the piston in order to reduce the lost travel.

Further, it is suggested that, in order to reduce the lost travel of the valve element—particularly in order to reduce the stroke of the closure member and/or of the valve seat of the valve element, the pressure piston is moved with a force to be measured which experiences a marked increase due to the closing operation of the valve element; that the travel of the piston from its initial position up to the marked force increase (first measured distance) is used as a first reference for the dimensioning of one or of a plurality of spacers; and that the valve element, in particular as an integral component of the pressure piston, is moved along with the pressure piston in the direction of the pressure increase; that, simultaneously, the pressure chamber associated with the pressure piston is exposed to a measurable medium, in particular air, with a pressure to be measured which experiences a marked increase due to the closing operation of the valve element; that the travel of the valve element from its initial position up to the marked pressure increase (second measured distance) is used as a second reference for the dimensioning of one or of a plurality of spacers to be arranged between the force transmission element and the pressure piston in order to reduce the lost travel.

When assembling a master cylinder of a hydraulic brake system, in particular for automotive vehicles, with a force transmission element, in particular a pressure element, which is to transmit the energy, in particular of a brake booster, to at least one piston of the master cylinder, it may be provided that, in order to reduce the lost travel of the central valve in particular arranged in the push-rod piston-particularly in order to reduce the stroke of the closure member and/or of the valve seat of the central valve, the piston is moved with a force to be measured which experiences a marked increase due to the closing operation of the central valve; that the travel of the piston from its initial position up the marked increase (measured distance) is used as an information for the dimensioning of one or of a plurality of spacers, in particular of spacing washers, to be arranged between the force transmission element, in particular the brake-booster-applied pressure element, and the piston.

An alternative embodiment of the method just described above consists in that, in order to reduce the lost travel of the central valve in particular arranged in the push-rod piston—preferably in order to reduce the stroke of the closure member and/or of the valve seat of the central valve, the central valve, in particular as an integral component of the piston, is moved along with the piston in the direction of the pressure increase; in that, simultaneously, the pressure chamber associated with the piston is exposed to a measurable medium, in particular air, with a pressure to be measured which experiences a marked increase due to the closing operation of the valve element; in that the travel of the central valve from its initial position up to the marked increase (measured distance) is used to determine the dimensioning of one or of a plurality of spacers, in particular of spacing washers, to be arranged between the force transmission element, in particular the brake-booster-applied pressure element, and the piston.

The two methods just described above may be combined in one assembling method. Said combined method would consist in that, in order to reduce the lost travel of the central valve in particular arranged in the push-rod piston—preferably in order to reduce the stroke of the closure member and/or of the valve seat of the central valve, the piston is moved with a force to be measured which experiences a marked increase due to the closing operation of the central valve; in that the travel of the piston from its initial position up to the marked force increase (first measured distance) is used as a first reference for the dimensioning of one or of a plurality of spacers, in particular of spacing washers, to be arranged between the force transmission element, in particular the brake-booster-applied pressure element, and the piston; and in that, simultaneously, the pressure chamber associated with the piston is exposed to a measurable medium, in particular air, with a pressure to be measured which experiences a marked increase due to the closing operation of the valve element; in that the travel of the central valve from its initial position up to the marked pressure increase (second measured distance) is used as a second reference for the dimensioning of one or of a plurality of spacers, in particular of spacing washers, to be arranged between the force transmission element, in particular the brake-booster-applied pressure element, and the piston.

An especially elegant method in conformity with the demands of automation consists in that pressure medium, in particular compressed air, is injected into the pressure chamber, which air at first passes through the central valve and enters the channel leading to the brake fluid storage reservoir; in that the piston of the master cylinder, in particular the push-rod piston if the cylinder is a tandem master cylinder, is moved in a direction pointing away from the brake pedal; in that the air pressure in the pressure chamber is measured during the movement of the piston; in that the measured distance of the piston is determined which is defined by the marked increase in the air pressure, which ensues during the closing operation of the central valve; in that the measured distance is used as a reference for the dimensioning of one or of a plurality of spacers, in particular of spacing washers, to be arranged between the force transmission element and the piston.

In the method just described above it may be provided that a trigger point for measuring purposes is determined which is in the last section of the line, in particular of the straight line, of a pressure-travel diagram and which limits the measured distance, said line describing in the marked pressure increase against the travel of the central valve.

A master-cylinder-and-brake-booster unit with a pressure element transmitting the energy of the brake booster to at least one piston of the master cylinder, said unit being assembled in accordance with any one of the described methods, can be designed such as to have one or a plurality of spacers, in particular of spacing washers, arranged between the piston of the master cylinder and the pressure element, which spacer(s) was/were dimensioned on the basis of at least one measured distance.

For implementing the described methods a device is suggested wherein it is provided that there are arranged a measuring device for the piston travel and a measuring device for the force acting on the piston; that an information processing unit is provided which determines the variation of the force as a function of the piston travel and the measured distance up to the marked force increase.

An alternative embodiment of this device consists in that there are provided a measuring device for the piston travel and a measuring device for the pressure, in particular the air pressure, prevailing in the pressure chamber of the master cylinder; in that an information processing unit is provided which determines the variation of the pressure as a function of the piston travel and the measured distance up to the marked pressure increase.

The two devices just described above can be combined in one device characterized in that there are provided one measuring device each for the piston travel, for the force acting on the piston, for the pressure prevailing in the pressure chamber, and one information processing system for processing the variations of the force and of the pressure as functions of the piston travel and for determining a measured distance which is a standard for dimensioning the spacer(s).

Further, a device is suggested the design of which consists in that there are provided a measuring device for the piston travel and a measuring device for the pressure prevailing in the pressure chamber of the master cylinder; in that an information processing unit is provided which determines the variation of the pressure as a function of the piston travel, a trigger point in the variation of the pressure increase, in particular in the last section of the pressure increase, and the measured distance of the piston up to the trigger point.

Further, a device can be provided which, due to the measured distance, determines and indicates the dimensioning and/or number of the spacers, in particular of the spacing washers.

BRIEF DESCRIPTION OF THE DRAWING

Further details of this invention are to be gathered from the following description of two examples of embodiments. Said examples of embodiments will be explained with reference to three FIGS.

DETAILED DESCRIPTION

Figure 1:
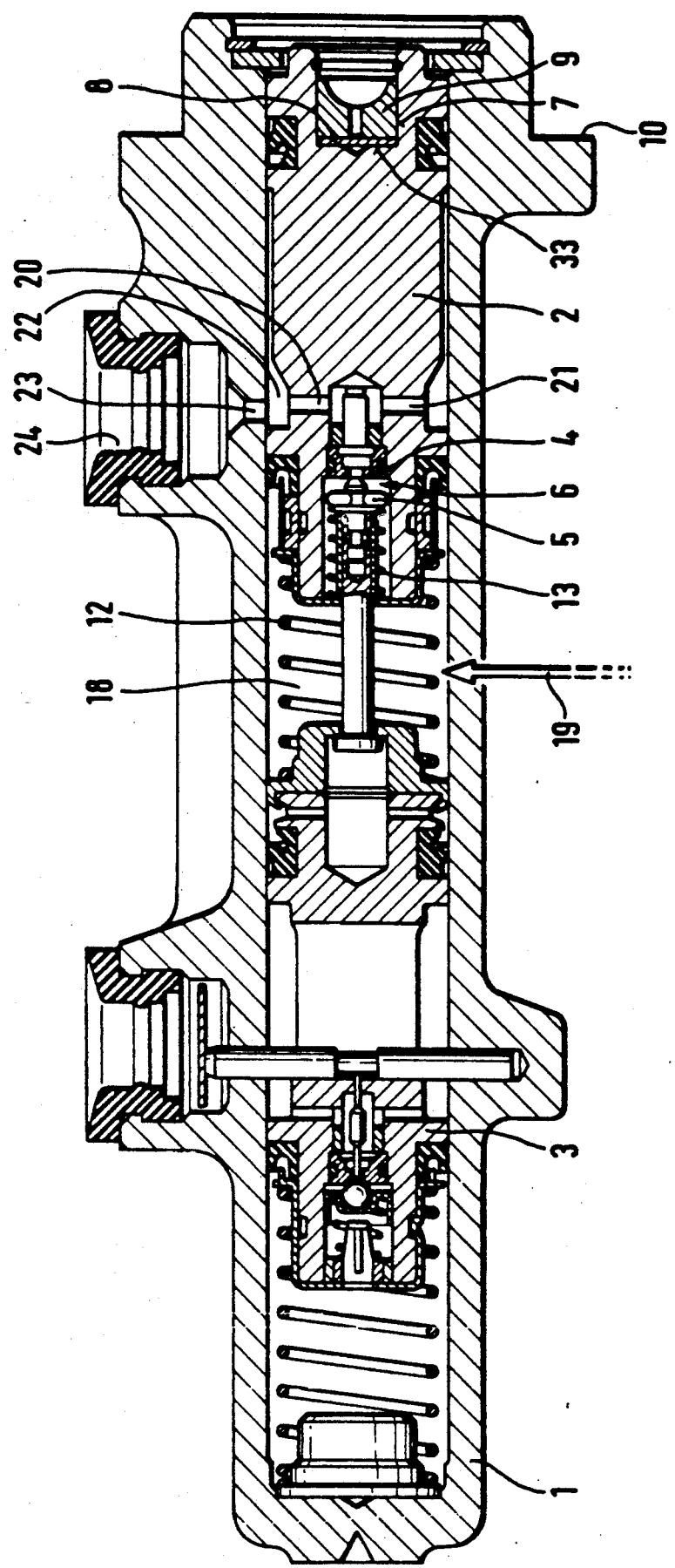
FIG. 1 is a master cylinder provided for assembly with a vacuum brake booster.

The master cylinder shown in FIG. 1 consists of a housing 1 and two pistons accommodated in the housing, i.e. push-rod piston 2 and floating piston 3. The push-rod piston 2 receives a central valve 6 in its interior. The function of the central valve 6 is described in the above-mentioned published patent application as well as in Published Patent Application No. 37 31 603 and in the 8th edition of the Alfred Teves GmbH "Bremsenhandbuch" (Brake Handbook) of 1984 (see inter alia: page 74). The central valve arranged in the push-rod piston 2 has a valve seat 4 and the valve closure member 5. The overall central valve has the reference numeral 6.

The push-rod piston 2 has a pocket bore 7 on the pedal side. The pocket bore has the bottom surface 33. The bore receives a spacer 8 and a pressure element 9. It is possible to use a plurality of spacing washers instead of the spacer.

During assembly, the tandem master cylinder is connected with a non-illustrated vacuum brake booster in the area of the flange surface 10. Cf. the above-mentioned published patent applications in this respect.

According to prior art, the tandem master cylinder and the vacuum brake booster are assembled as follows:

At first the axial distance is ascertained which exists between flange surface 10 and the bottom 33 of the pocket bore (bore depth of the pressure element). Then the axial dimension of the spacer 8 or the number of the spacing washers is determined.

The spacer or rather the spacing washers serve for transmitting the translatory energy applied by the vacuum brake booster to the pressure element 9. The spacer or rather the spacing washers pass this force on to the push-rod piston 2.

The reference distance ascertained by means of the method of prior art permits the tandem master cylinder and the vacuum brake booster to be assembled free from play. The disadvantage of this method consists in that all tolerances of the individual components fully add up in the central valve's closing travel. At the pedal, the large lost travel of the central valve multiplies itself with the pedal's transmission ratio which leads to disadvantages in the brake pedal's operation.

In the following, the inventive method will be described where the gauge from the flange surface 10 up to the bottom 33 of the pressure element bore 7 will be determined, with the central valve being closed.

Figure 2:
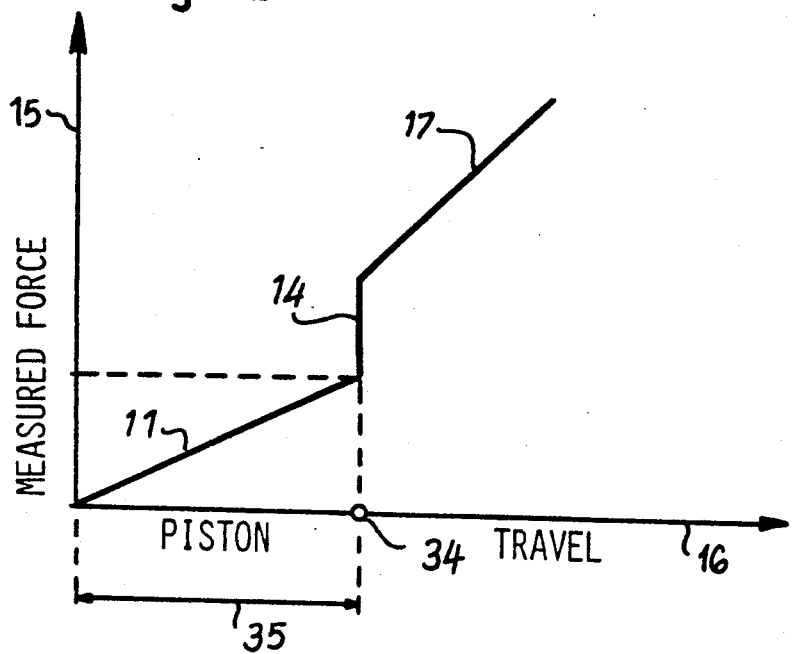
FIG. 2 is a force-travel diagram.

The tandem master cylinder will be assembled except for the spacer 8, or rather the spacing washers, and the pressure element 9. In the first example of an embodiment, the distance between flange surface 10 and bottom 33 of the pressure element bore will be determined with the aid of measuring a force. In detail, the following will happen: The push-rod piston 2 will be pushed into the cylinder housing 1, with the force being measured. The force will experience a continuous and linear increase; see straight line 11 of the force-travel diagram as per FIG. 2. The straight line 11 indicates the increase in force of the push-rod piston spring 12 minus the force of the spring 13 of the central valve 6 because the spring 13, as compared with the spring 12, will act on the push-rod piston 2 in the opposite direction from that of spring 12. The push-rod piston 2 will be displaced to the left in FIG. 1 as far as the point where the valve seat 4 of the central valve will be seated on the closure member 5 of the central valve. The central valve will be closed after this operation has terminated. At this moment, a clear increase in force will be measurable. This is illustrated by straight line 14 in the force-travel diagram of FIG. 2, said straight line 14 essentially running parallel to the ordinate 15 of the diagram.

The ordinate carries the units of the measured force while the abscissa 16 registers the units of the travel of the push-rod piston.

The clear force increase in point 34, and this after having overcome the measured distance 35 of the abscissa, can be explained by the fact that the force of the spring 13 exerted on piston 2 becomes balanced when valve 6 is closed. As of this point only spring 12 will be active, which spring 12 acts on the push-rod piston in the direction towards the brake pedal. Straight line 17 illustrates the further increase of the force after the central valve has closed.

The value of the measured distance 35 will be referred to for determining the axial thickness of the spacer 8 or for determining the number of the spacing washers. Said spacer, or rather the spacing washers, will subsequently be inserted between the pressure element 9 and the push-rod piston 2 so as to rest on the bottom 33.

The second example of an embodiment will be explained with reference to the diagram as per FIG. 3.

The abscissa carries the units of the travel of the central valve, or rather of the push-rod piston, wherein the central valve is accommodated as an integral component.

On the ordinate, the units of air pressure are traced which prevails in pressure chamber 18 during measuring.

In accordance with the second example of an embodiment, compressed air is injected into the pressure chamber 18. To this end, use is made of the tandem master cylinder's pressure connection for the push-rod-piston-side pressure chamber. Arrow 19 schematically represents said pressure connection in FIG. 1. The direction of the arrow represents the direction of the injected compressed air. When the central valve 6 is open the compressed air injected into pressure chamber 18 will escape between the closure member 5 of the central valve and the valve seat 4 of the central valve to the outside via the radially arranged bores 20, 21, the annular chamber 22, the channel 23, the connection 24 for the storage reservoir.

Figure 3:
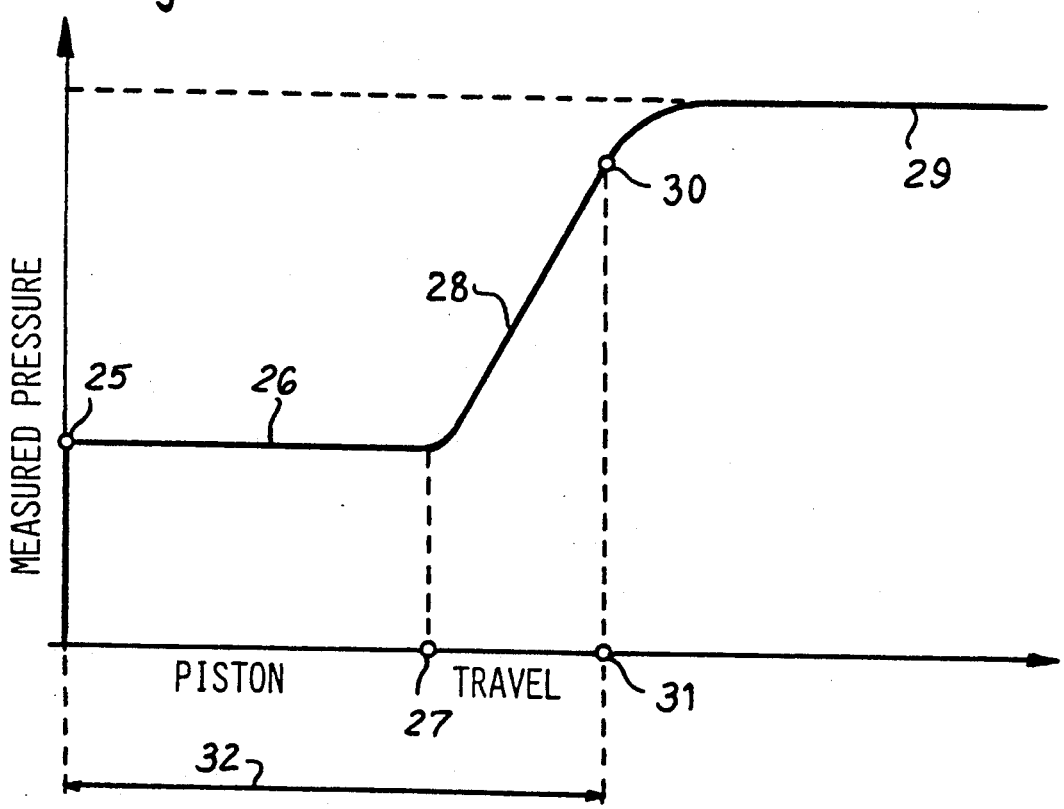
FIG. 3 is an air pressure-travel diagram.

The initial air pressure is traced in point 25 in the diagram as per FIG. 3. When the push-rod piston 2 is moved to the left in FIG. 1, at first, the air pressure will remain approximately constant; see straight line 26 of FIG. 3. In point 27 on the abscissa, the movement of the push-rod piston will have advanced so far that the closing operation of the central valve will start.

The valve opening area for the air between the valve member 5 and the valve seat 4 will be reduced. This means that there will be an increase in the air pressure in pressure chamber 18. In FIG. 3, this is illustrated by the ascending line which, as is evident from FIG. 3, is a straight line over a larger area. Finally, the central valve will be closed and there will prevail an increased pressure in pressure chamber 18. In the diagram, this is represented by straight line 29.

During the leftward movement of the push-rod piston 2, the pressure in pressure chamber 18 is continuously measured. In the last part of straight line 28, a trigger point 30 will be fixed for measuring purposes. It is by means of this trigger point that point 31 on the abscissa will be determined. The distance between zero point and point 31 on the abscissa will be the measured distance 32. Said measured distance, i.e., the travel of the central valve—or rather of the push-rod piston—up to the trigger point, will be used in determining the dimensioning of the spacer 8 or of one or of a plurality of spacing washers.

It is possible to combine the two methods of force measurement as a function of the travel of the central valve/push-rod piston and of air pressure measurement as a function of the travel of the central valve/push-rod piston with each other.

What is claimed is:

1. The method of adjusting a brake system master cylinder unit to establish a predetermined distance of travel of a pressure means of said unit induced by an external force applying means from a rest position to a pressure applying position wherein said unit comprises a housing having a piston receiving bore therein having a closed forward end and an open rear end, means defining a supply passage in said housing opening into said bore at a location spaced forwardly from said rear end, a pressure piston slidably and sealingly received within said bore for forward and rearward movement relative to said housing in overlapping relationship to said supply passage and defining a pressure chamber in said bore at the forward end of said piston, a force transmitting member carried on the rearward end of said piston for engagement by said external force applying means, a spring seat in said pressure chamber spaced forwardly from said piston, first spring means engaged between said seat and said piston biasing said piston rearwardly relative to said spring seat to a rest position, valve means in said piston for controlling communication between said chamber and said supply passage and including a valve head movable forwardly and rearwardly relative to said piston and a valve seat located rearwardly of said head, second spring means biasing said valve head rearwardly of said piston toward said valve seat, and stop means on said valve head engageable with said spring seat limiting rearward movement of said valve head relative to said seat, said piston when in said rest position locating said valve head in forwardly spaced relationship to said valve seat to place said chamber in communication with said supply passage and being operable upon forward movement relative to said spring seat to enable said second spring means to shift said valve head onto said valve seat to block communication between chamber and said supply passage;

said method comprising the steps of advancing said piston forwardly from said rest position while continuously observing a parameter representative of the magnitude of the force resisting the forward movement of said piston, measuring the distance of travel of said piston from its rest position to a position at which a substantial variation of the observed parameter indicative of a sudden increase in the magnitude of the resisting force occurs, and adjusting the position of said force transmitting member rearwardly of said piston by an adjusting distance equal to the measured distance of travel minus said predetermined distance of travel.

2. The method defined in claim 1 wherein the step of observing a parameter representative of the force resisting movement of the piston comprises the step of measuring the movement inducing force applied to said piston to sense the engagement of said valve head with said valve seat.

3. The invention defined in claim 1 wherein the step of observing a parameter representative of the force resisting movement of said piston comprises the steps of venting said supply passage, connecting said pressure chamber to an external source of air at constant pressure and monitoring the pressure in said chamber to sense the increase in pressure in said chamber resulting from the engagement of said valve head with said valve seat.

4. The invention defined in claim 1 wherein the step of adjusting the position of said force transmitting member includes the steps of forming a transmitting member receiving bore of fixed depth in the rearward end of said piston, inserting into said bore spacer means of a thickness equal to said adjusting distance.

* * * * *